UNITED STATES PATENT OFFICE.

LUDWIG TAUB AND HANS HAHL, OF ELBERFELD, GERMANY, ASSIGNORS TO FARBEN-FABRIKEN VORM. FRIEDR. BAYER & CO., OF ELBERFELD, GERMANY, A CORPORATION OF GERMANY.

PHARMACEUTICAL PRODUCT.

1,022,645.

Specification of Letters Patent.   Patented Apr. 9, 1912.

No Drawing.   Application filed September 1, 1911.   Serial No. 647,255.

*To all whom it may concern:*

Be it known that we, LUDWIG TAUB and HANS HAHL, doctors of philosophy, chemists, citizens of the German Empire, residing at Elberfeld, Germany, have invented new and useful Improvements in New Pharmaceutical Products, of which the following is a specification.

We have found that new esters of glycol can be obtained by esterification of benzoic acid derivatives e. g. nitro-, chloro-, or methylbenzoic acids with glycol. The new esters having most probably the following general formula:

$$X-COO.CH_2.CH_2-OH;$$

X meaning a substituted phenyl, have proved to be excellent remedies against scabies. They possess the advantage over Peru balsam hitherto used for this purpose that they are odorless, non-irritant and easily soluble.

In order to illustrate the new process more fully the following example is given, the parts being by weight:—178.5 parts of the sodium salt of ortho-chloro-benzoic acid are heated with 80.5 parts of glycol chlorhydrin in an oil bath during 4 hours to 145° C. When the solution is cooled ether is added to it and the ethereal solution is washed with soda and water. After drying the ether is distilled off and the residue is fractionated *in vacuo*. The ester is a limpid oil which boils at 205° C. under a pressure of 20 mm. The ester obtained from the para-nitro-benzoic acid melts at 63° C.

We claim:—

1. The herein described glycol esters of benzoic acid derivatives of the formula:

$$X-COO.CH_2.CH_2OH$$

X meaning a substituted phenyl which are odorless, non-irritant and being valuable remedies against scabies, substantially as described.

2. The herein described glycol-ortho-chloro-benzoic acid ester of the formula:

$$Cl.C_6H_4.COO.CH_2.CH_2.OH$$

which is a limpid oil boiling at 205° C. under a pressure of 20 mm. and being a valuable remedy against scabies, substantially as described.

In testimony whereof we have hereunto set our hands in the presence of two subscribing witnesses.

LUDWIG TAUB. [L. S.]
HANS HAHL. [L. S.]

Witnesses:
CHAS. J. WRIGHT,
L. NUFER.